United States Patent [19]
Girard

[11] Patent Number: 5,116,000
[45] Date of Patent: May 26, 1992

[54] ADAPTABLE SYSTEM FOR STORING LIQUID UNDER PRESSURE AND SPACECRAFT PROPELLANT STORAGE APPLICATIONS THEREOF

[75] Inventor: Alain Girard, Cagnes Sur Mer, France

[73] Assignee: Aerospatiale Societe Nationale Industrielle, Paris, France

[21] Appl. No.: 629,764

[22] Filed: Dec. 18, 1990

[30] Foreign Application Priority Data

Dec. 18, 1989 [FR] France ............................. 89 16708

[51] Int. Cl.$^5$ ............................................ B64D 37/00
[52] U.S. Cl. ............................ 244/135 R; 244/135 C
[58] Field of Search ........... 244/135 R, 135 B, 135 C, 244/172, 158 R; 220/85 S; 62/48.1; 137/571, 565, 883

[56] References Cited

U.S. PATENT DOCUMENTS

| | | | |
|---|---|---|---|
| 2,111,839 | 3/1938 | Chenicek | 220/85 S |
| 2,583,062 | 1/1952 | Riboud | 137/571 |
| 3,046,751 | 7/1962 | Gardner | 220/85 S |
| 3,169,379 | 2/1965 | Black | 62/48.1 |
| 3,379,208 | 4/1968 | Alleaume | 137/571 |
| 4,157,248 | 6/1979 | Queiser | 220/85 S |
| 4,880,185 | 11/1989 | Apfel | 244/172 |
| 4,890,764 | 1/1990 | Rossini | 220/85 S |
| 4,895,272 | 1/1990 | De Benedittis et al. | 220/85 S |

FOREIGN PATENT DOCUMENTS 0132175 1/1985 European Pat. Off. .
2063672 7/1971 France .

OTHER PUBLICATIONS

Journal of Spacecraft and Rockets, vol. 18, No. 6, Dec. 1981, New York, U.S.; pp. 499-505; H. Macklis et al., "Selection of an Optimized Integrated Propulsion System".

*Primary Examiner*—Joseph F. Peters, Jr.
*Assistant Examiner*—Anne E. Bidwell
*Attorney, Agent, or Firm*—Browdy and Neimark

[57] ABSTRACT

A system for storing liquid under pressure is adapted to contain any of various quantities of liquid determined in advance with approximately the same filling ratio in an environment in which the temperature varies. It comprises a main storage tank adapted to contain at least the largest of these quantities of liquid in such a way as to leave a residual volume of pressurized gas and a reserve gas storage capacity mechanically independent of the main storage tank and in permanent communication with the residual volume of pressurized gas via a liquid non-return device. The reserve capacity is chosen so that the quantity of liquid actually introduced into the system divided by the sum of the volumes of the main storage tank and reserve capacity is at least approximately equal to the filling ratio.

21 Claims, 1 Drawing Sheet

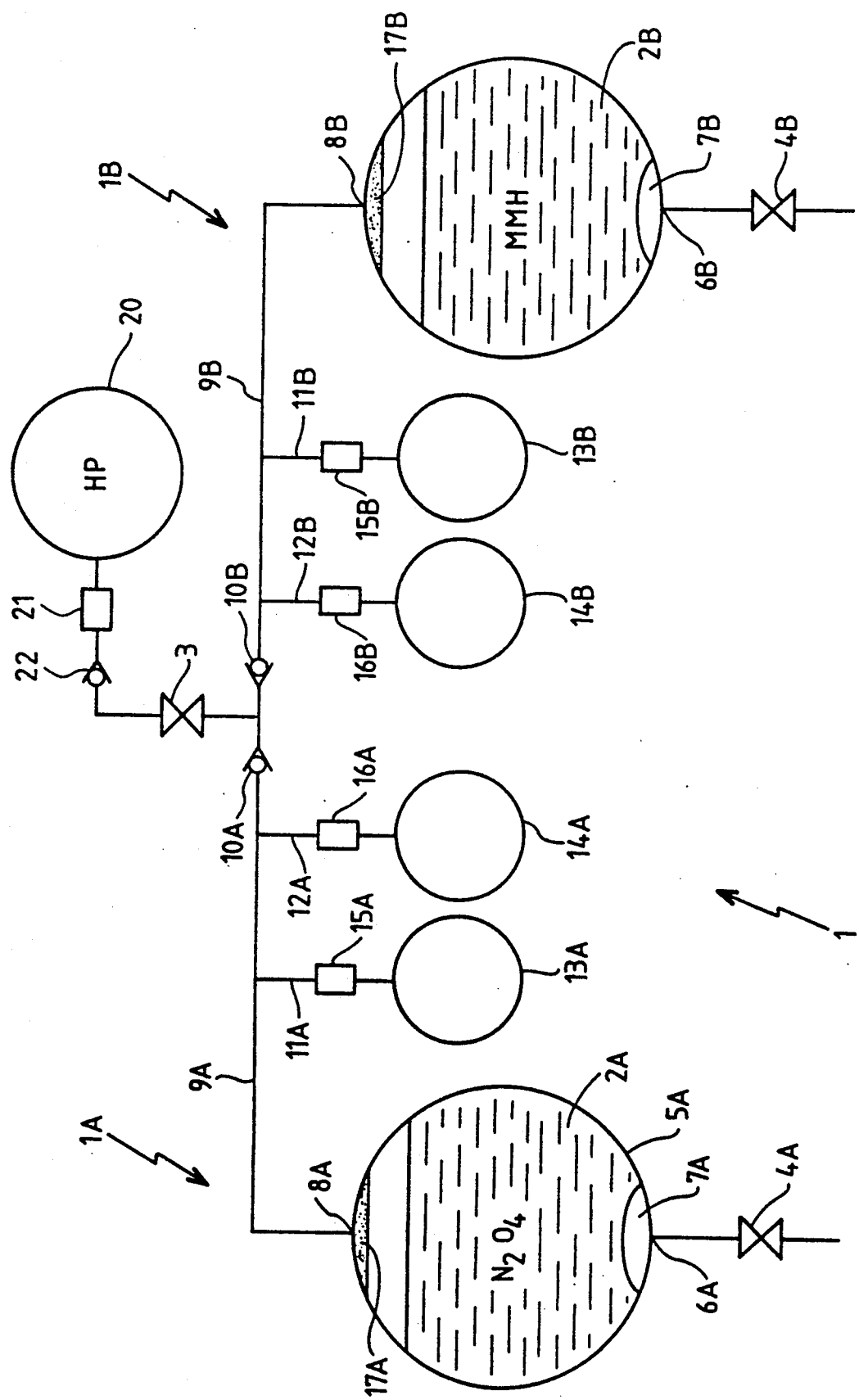

ADAPTABLE SYSTEM FOR STORING LIQUID UNDER PRESSURE AND SPACECRAFT PROPELLANT STORAGE APPLICATIONS THEREOF

BACKGROUND OF THE INVENTION

1. Field of the Invention

The invention concerns a system for storing liquid under pressure including a pressurized storage tank and a particular application of this system on spacecraft for storing one or more liquid propellants.

2. Description of the Prior Art

There are many known applications of storage tanks containing liquids at a pressure compatible with their subsequent use. Given the serious damage that can be caused by an exploding pressurized storage tank, these containers are dimensioned to minimize this risk in all planned operating conditions with safety margins in line with applicable regulations.

The storage tank containing the liquid is usually hermetically closed. It generally contains a pressurizing gas. The ratio between the volume of the liquid and the total interior volume of the storage tank is referred to hereinafter as the filling ratio.

The container is closed at a particular pressure and at a particular temperature and with a given filling ratio.

The temperature may vary after the container is closed.

If the temperature increases, the pressure increases. The pressure increase is complicated to calculate as not only does the gas pressure increase with temperature but also the liquid expands, its saturation vapor pressure in the pressurizing gas increases and the container volume changes due to its elasticity.

Generally speaking, however, the pressure increases with the temperature and the rate of increase is directly proportional to the storage tank filling ratio: the pressure in a given container when half full will increase substantially as predicted by the perfect gas laws but the same container if completely full is likely to rupture very quickly for the same rise in temperature, rather like a bottle of water which freezes, as the elasticity of the envelope is not able to withstand the expansion of the incompressible fluid.

The maximum pressure therefore depends on the temperature and the pressure at which the container is closed, on the filling ratio and on the maximum design temperature. The maximum pressure is one of the most important parameters in determining the size of the envelope. The higher the pressure the thicker and therefore the heavier the storage tank must be.

For a given quantity of liquid, a given initial pressure and a given temperature range the storage tank mass is minimal for a particular optimum filling ratio. With a smaller storage tank and therefore a higher filling ratio the storage tank is heavier as it must be thicker. With a larger storage tank the wall thickness may be reduced but the mass is nevertheless increased because of the increased surface area of the envelope.

Spacecraft and satellites routinely employ pressurized storage tanks to transport and use liquids, in particular propellants for the apogee burn and subsequent correction maneuvers. As mass is an extremely critical parameter in spacecraft (up to 100 tonnes of fuel can be required at launch per kilogram of payload put into orbit, and the quantity of propellants can represent more than half the total mass of a geostationary satellite, for example), the mass of the storage tanks is a key factor in the overall mass.

In the case of geostationary satellites, the launch site can be at different latitudes. The French ARIANE launch vehicle is launched from Kourou in Guyana, for example, American launch vehicles are launched from the Kennedy Space Center in Florida, and Chinese launch vehicles are launched from Xichang. Because of the laws of celestial mechanics, different quantities of propellants are required at different launch sites for the same mission and the same mission life, the quantity of propellants increasing with the latitude of the launch site. The ARIANE launch site is optimal because of the low inclination (7° to 10°) of the transfer orbit, as compared with transfer orbit inclinations of 27° to 28° for a launch from Florida.

The quantities of propellants can differ by as much as 20%.

It is routine practise to design satellites to be compatible with different launch vehicles to enable the satellite owners more flexibility in negotiating launch fees and to provide a backup in the event of a serious failure in a family of launch vehicles.

Given the interior complexity of satellite propellant storage tanks (associated with the low gravity and the acceleration that can be required), which usually incorporate relatively delicate capillary retention devices, given also the position of the storage tanks on the satellite and the fact that they are assembled by welding, and given finally the late date at which it may become necessary to change launch vehicles, there is no question of modifying the storage tanks to suit the launch vehicle. Satellites therefore have propellant storage tanks designed and sized to suit the launch vehicle imposing the severest constraints in respect of propellant quantities.

An object of the present invention is to enable optimization of the mass of the propellant storage system according to the differing quantities of propellants, allowing for the launch site, for example, by enabling adaptation of the usable volume of the propellant storage tank at a late stage in the assembly of the satellite.

A more general object of the invention is a system for storing liquid under pressure adapted to withstand temperature variations within a known range and the mass of which can be optimized by means of minor modifications according to the quantity of liquid to be eventually introduced into the system.

SUMMARY OF THE INVENTION

The present invention consists in a system for storing liquid under pressure adapted to contain any of various quantities of liquid determined in advance with approximately the same filling ratio in an environment in which the temperature varies, said system comprising a main storage tank adapted to contain at least the largest of said quantities of liquid in such a way as to leave a residual volume of pressurized gas and comprising a reserve gas storage capacity mechanically independent of said main storage tank and in permanent communication with said residual volume of pressurized gas via a liquid non-return device, said reserve capacity being chosen such that the quantity of liquid actually introduced into the system divided by the sum of the volumes of said main storage tank and reserve capacity is at least approximately equal to said filling ratio.

Advantageous features of the invention, some of which can be combined with others, include:

said reserve capacity is connected to an inlet pipe connected to an inlet aperture of said main storage tank and to a gas inlet valve adapted to be normally closed in a storage configuration, said liquid non-return device is situated where said pipe by which said reserve capacity is in communication with said residual volume of gas discharges into said main storage tank, said reserve capacity represents at most 15% of the capacity of said main storage tank, said reserve capacity is provided by one or more storage tanks each having a volume approximately equal to between 5 and 10% of the capacity of said main storage tank, said main storage tank has an interior volume such that the largest quantity of liquid represents a filling ratio of between 95 and 99%.

In another aspect, the invention consists in a spacecraft using at least one liquid propellant and comprising a system for storing liquid under pressure adapted to contain any of various quantities of liquid determined in advance with approximately the same filling ratio in an environment in which the temperature varies, said system comprising a main storage tank adapted to contain at least the largest of said quantities of liquid in such a way as to leave a residual volume of pressurized gas and a reserve gas storage capacity mechanically independent of said main storage tank and in permanent communication with said residual volume of pressurized gas via a liquid non-return device, said reserve capacity being chosen such that the quantity of liquid actually introduced into the system divided by the sum of the volumes of said main storage tank and reserve capacity is at least approximately equal to said filling ratio.

Further preferred features of the invention include:
said main storage tank incorporates a capillary retention device at its liquid outlet,
said reserve capacity comprises at least one storage tank,
a second, identical system is provided for storing under pressure a second propellant, the first-mentioned system and said second system being connected to a common source of pressurizing gas,
said reserve capacity is removable.

Objects, characteristics and advantages of the invention will emerge from the following description given by way of non-limiting example only with reference to the appended diagrammatic drawings in which the single figure shows a system for storing liquid under pressure in accordance with the invention applied to storing propellants in a spacecraft or satellite.

DETAILED DESCRIPTION OF THE INVENTION

The system 1 for storing liquid under pressure is a duplicated system in the sense that it is adapted to store two different propellants 2A and 2B; these are $N_2O_4$ and MMH (monomethylhydrazine) in practice.

Each branch 1A and 1B of the system is specific to one of the two propellants. In the remainder of the description the suffix A denotes anything specific to the first propellant (the $N_2O_4$ in this example) and the suffix B denotes anything specific to the other propellant (the MMH).

The branch 1A extends from an inlet valve 3 common to both branches to an outlet valve 4A. It comprises a spherical liquid storage tank 5A which contains all of the propellant 2A. A variation on this arrangement (not shown, and little frequently used in practise) has the storage capacity provided by the storage tank 5A divided between a number of liquid storage tanks disposed in parallel.

On the inlet side of its outlet orifice 6A the storage tank 5A comprises in the conventional way a capillary retention device 7A of any appropriate known type. The device 7A is in practise larger and more complex than shown here but as it does not of itself form any part of the invention it will not be described in more detail.

The inlet orifice 8A of the storage tank 5A is connected to an inlet pipe 9A including a non-return valve 10A at the point where it departs from the inlet pipe 9B of the other branch.

The inlet pipe is connected to two branch pipes 11A and 12A connected to respective small storage tanks 13A and 14A. The pipes 11A and 12A incorporate connectors 15A and 16A which are blanked off until the small storage tanks are fitted and during any preceding storage. The small storage tanks 13A and 14A together define a reserve storage capacity for the main storage tank 5A, with which they are in communication at all times.

A non-return device 17A is provided between the interior of the main storage tank 5A and the reserve capacity 13A/14A to prevent any flow of liquid towards the reserve capacity from which the liquid could not be recovered.

The device 17A is of any known type and is disposed at the inlet orifice 8A of the storage tank.

The storage tanks 13A and 14A providing the reserve capacity are of much simpler structure than the main storage tank 5A because they are designed to contain only gas. They are also small and therefore light in weight and easy to accommodate in the satellite where empty space is always available (the number of small storage tanks between which the reserve capacity is divided can in fact be chosen according to the available space). Being small and light in weight, these storage tanks are also easy to mount and they can be mounted much later in the satellite assembly process than the main storage tank.

The above description of the branch 1A applies equally (except for changing the suffix A for B) to the branch 1B.

Throughout the launch phase the valves 3, 4A and 4B are closed. Before the propellant is used for the first time (in practise for the apogee burn) the valve 3 is opened to establish communication between the branches 1A and 1B and a high pressure source 20 connected through a pressure regulator 21 and a non-return valve 22. This high pressure feeds the propellants to the thrusters (not shown).

The design calculations for the storage system 1 as a whole are as follows.

The volume of the main storage tank for each propellant (the storage tank 5A or 5B) is determined for the maximal quantity $Q_{max}$ of the propellant in question required at the prospective launch site which imposes the severest constraint, with a filling ratio $Tx_{max}$ approaching (but less than) unity.

Those skilled in the art know how to determine the quantity of propellant $Q_{opt}$ and the filling ratio $Tx_{opt}$ which represents substantially optimal filling of the main storage tank taken in isolation for the design temperature range and the design initial pressure, in other words the filling ratio resulting in minimum mass of the main storage capacity.

If this optimum filling ratio is exceeded, the main storage capacity is not able to withstand the maximum pressure arising if the temperature increases.

To enable the main storage capacity to be used with a filling ratio exceeding $Tx_{opt}$, the invention provides one or more small additional exterior storage tanks 13A, 14A, etc connected to the main storage tank by one or more pipes (one pipe 9A in this example) discharging into the main storage tank at a location where there can never be any liquid but only the pressurizing gas. The additional storage tanks are filled with pressurizing gas only and are at the same pressure as the main storage tanks.

The presence of this reserve capacity reduces the effective filling ratio of the overall storage capacity and enables expansion of the liquid to expel the pressurizing gas from the main storage tanks towards the reserve tanks. It remains necessary to ensure that the liquid cannot expand to the degree that its volume exceeds the volume of the main storage tank. This condition defines the maximum filling ratio $Tx_{max}$ which is in practise between 97 and 99%, depending on the propellants.

The minimum volume of the reserve capacity will depend on the effective or overall filling ratio chosen (around 95 to 90% in practise, or even 95%) and on the quantity of propellant actually required.

The present invention therefore makes it possible to use a given main storage tank to carry in an optimized way different quantities of liquid (for different prospective launch sites) by associating with it one or more (or possibly no) auxiliary storage tanks 13A, 14A, etc. fitted near the launch date. For a satellite storage tank with a capillary retention device this is all the more advantageous given that only the main tanks containing the liquid must incorporate a capillary retention device and not the auxiliary tanks which contain only the gas.

The invention therefore makes it possible to allow for the different propellant requirements associated with the different prospective launch site for a geostationary satellite (because of the inclination of the transfer orbit, which depends on the geographical latitude at the launch site) and also makes it possible to meet the requirements of satellite operators who demand compatibility with two launch systems as a backup against possible deficiencies of one launch system and to provide increased flexibility in negotiating launch fees.

An alternative would be to size the system of storage tanks to provide the storage capacity needed for the launch site imposing the most severe requirements with one or more auxiliary tanks installed and subsequently to remove some or all of the auxiliary tanks (blanking off the connectors 15A or 16A, or 15B or 16B) if the launch site eventually chosen requires less propellant.

Using the invention it is possible to save up to 10% of the total mass of the storage tank.

To give a concrete example, the main storage tanks have a capacity of 1 000 liters and the reserve tank a capacity of 50 liters. The reserve tanks are made from titanium 0.5 mm thick, enabling them to withstand an internal pressure typically in the order of 17 bars (possibly with short-term peaks of up to 25 bars, or even more), with a unit mass of around 2 kg. The discharge pressure in service is substantially equal to the filling pressure.

These reserve tanks are in practise made from metal or from a plastics material resisting corrosion by the propellant concerned. They may be flexible but it is preferable if they are sufficiently rigid to keep their shape and size substantially constant.

The invention is of particular benefit in aerospace applications but may find other applications in sectors in which it is necessary to minimize the overall size or weight of a liquid storage system (chemistry, etc).

It goes without saying that the above description has been given by way of non-limiting example only and that numerous variations may be put forward by those skilled in the art without departing from the scope of the invention.

There is claimed:

1. System for storing liquid under pressure for containing any one of a plurality of different predetermined liquid quantities including a largest liquid quantity with approximately a same filling ratio in an environment in which the temperature varies, said system comprising
a main storage tank adapted to contain the whole of any selected one of said plurality of liquid quantities and a residual volume of pressurized gas, and a reserve gas storage capacity mechanically independent of said main storage tank and in permanent communication during storage with said residual volume of pressurized gas via a liquid non-return device, said gas reserve capacity having a volume specifically chosen as a function of a selected liquid quantity to be actually introduced into the system so that said selected liquid quantity divided by the sum of the volumes of said main storage tank and gas reserve capacity is at least approximately equal to said filling ratio.

2. System according to claim 1 characterized in that said gas reserve capacity is connected to an inlet pipe connected to an inlet aperture of said main storage tank and to a gas inlet valve adapted to be normally closed in a storage configuration.

3. System according to claim 1 wherein said liquid non-return device is situated where a pipe by which said reserve capacity is in communication with said residual volume of gas discharges into said main storage tank.

4. System according to claim 1 wherein said volume of said gas reserve volume represents at most 15% of the capacity of said main storage tank.

5. System according to claim 4 wherein said gas reserve capacity consists of one or more gas storage tanks each having a volume approximately equal to between 5 and 10% of the volume of said main storage tank.

6. System according to claim 4 wherein said main storage tank has an interior volume such that said largest quantity of liquid fills between 95 and 99% of said interior volume.

7. System according to claim 1 wherein said gas reserve capacity consists of one or more gas storage tanks each having a volume approximately equal to between 5 and 10% of the volume of said main storage tank.

8. System according to claim 1 wherein said main storage tank has an interior volume such that said largest quantity of liquid fills between 95 and 99% of said interior volume.

9. Spacecraft using at least one liquid propellant and comprising a system for storing liquid under pressure for containing any one of a plurality of different predetermined liquid quantities including a largest liquid quantity with approximately a same filling ratio in an environment in which the temperature varies, said system comprising
a main storage tank adapted to contain the whole of any selected one of said plurality of liquid quantities and a residual volume of pressurized gas, and a reserve gas storage capacity mechanically independent of said main storage tank and in permanent communication during storage with said residual volume of pressurized gas via a liquid nonreturn device, said gas reserve capacity having a volume specifically chosen as a function of a selected liquid quantity to be actually introduced into the system so that said selected liquid quantity divided by the sum of the volumes of said main storage tank and gas reserve capacity is at least approximately equal to said filling ratio.

10. Spacecraft according to claim 9 wherein said main storage tank comprises a liquid outlet provided with a capillary retention device at its liquid outlet.

11. Spacecraft according to claim 9 wherein said reserve capacity comprises at least two gas storage tanks.

12. Spacecraft according to claim 9 comprising a second, identical system for storing under pressure a second propellant, the residual volumes of pressurized gas of both systems being connected to a common source of pressurizing gas through gas inlet pipes normally closed.

13. Spacecraft according to claim 9 characterized in that said gas reserve capacity is connected to an inlet pipe connected to an inlet aperture of said main storage tank and to a gas inlet valve adapted to be normally closed in a storage configuration.

14. Spacecraft according to claim 9 wherein said liquid non-return device is situated where a pipe by which said reserve capacity is in communication with said residual volume of gas discharges into said main storage tank.

15. Spacecraft according to claim 9 wherein said volume of said gas reserve volume represents at most 15% of the capacity of said main storage tank.

16. Spacecraft according to claim 15 wherein said gas reserve capacity consists of one ore more gas storage tanks each having a volume approximately equal to between 5 and 10% of the volume of said main storage tank.

17. Spacecraft according to claim 15 wherein said main storage tank has an interior volume such that said largest quantity of liquid fills between 95 and 99% of said interior volume.

18. Spacecraft according to claim 9 wherein said gas reserve capacity consists of one or more gas storage tanks each having a volume approximately equal to between 5 and 10% of the volume of said main storage tank.

19. Spacecraft according to claim 9 wherein said main storage tank has an interior volume such that said largest quantity of liquid fills between 95 and 99% of said interior volume.

20. Spacecraft using at least one liquid propellant and comprising a system for storing liquid under pressure adapted to contain any of various quantities of liquid determined in advance with approximately the same filling ratio in an environment in which the temperature varies, said system comprising a main storage tank adapted to contain at least the largest of said quantities of liquid in such a way as to leave a residual volume of pressurized gas and a removable reserve gas storage capacity mechanically independent of said main storage tank and in permanent communication with said residual volume of pressurized gas via a liquid-non-return device, said reserve capacity being chosen such that the quantity of liquid actually introduced into the system divided by the sum of the volumes of said main storage tank and reserve capacity is at least approximately equal to said filling ratio.

21. System for storing liquid under pressure adapted to contain any of various quantities of liquid determined in advance with approximately the same filling ratio in an environment in which the temperature varies, said system comprising a main storage tank adapted to contain at least the largest of said quantities of liquid in such a way as to leave a residual volume of pressurized gas, and a reserve gas storage capacity mechanically independent of said main storage tank and in permanent communication with said residual volume of pressurized gas via a liquid non-return device, said reserve capacity being chosen such that the quantity of liquid actually introduced into the system divided by the sum of the volumes of said main storage tank and reserve capacity is at least approximately equal to said filling ratio, wherein said liquid non-return device is situated where a pipe by which said reserve capacity is in communication with said residual volume of gas discharges into said main storage tank.

* * * * *